United States Patent [19]

Kim

[11] Patent Number: 5,574,583
[45] Date of Patent: Nov. 12, 1996

[54] LIQUID CRYSTAL DISPLAY DEVICE HAVING A COMPENSATION LAYER AND METHOD FOR FABRICATING THE SAME

[75] Inventor: Jae B. Kim, Kyoungki-do, Rep. of Korea

[73] Assignee: Hyundai Electronics Industries Co. Ltd., Kyoungki-do, Rep. of Korea

[21] Appl. No.: 608,955

[22] Filed: Feb. 29, 1996

Related U.S. Application Data

[63] Continuation of Ser. No. 284,137, Aug. 2, 1994, abandoned.
[51] Int. Cl.$^6$ .................................................. G02F 1/1333
[52] U.S. Cl. ............................. 359/74; 359/81; 359/87
[58] Field of Search ............................. 359/74, 80, 81, 359/87

[56] References Cited

U.S. PATENT DOCUMENTS

| | | | |
|---|---|---|---|
| 3,966,305 | 6/1976 | Young | 359/74 |
| 4,725,517 | 2/1988 | Nakanowateri et al. | 359/81 |
| 4,854,675 | 8/1989 | Yamazaki et al. | 359/80 |

FOREIGN PATENT DOCUMENTS

| | | | |
|---|---|---|---|
| 56-51326 | 12/1981 | Japan | 359/74 |
| 57-92315 | 6/1982 | Japan | 359/80 |
| 2143336 | 2/1985 | United Kingdom | 359/81 |

*Primary Examiner*—William L. Sikes
*Assistant Examiner*—James A. Dudek
*Attorney, Agent, or Firm*—Gary M. Nath; Nath & Associates

[57] ABSTRACT

A liquid crystal display device including a compensation layer or dummy pattern provided at a region where transparent electrode films formed on upper and lower glass plates are not overlapped with each other, the compensation layer or dummy pattern having a thickness substantially corresponding to the thickness of one transparent electrode film and serving to provide a uniform cell gap, thereby capable of achieving an improvement in display quality. The compensation layer is made of an $SiO_2$ based material and formed on a region where the transparent electrode films are not overlapped with each other by use of an offset roll coating process, before or after a formation of a top coating film disposed on the transparent electrode films, the compensation layer having the same thickness as the transparent electrode films. The compensation layer removes the duality of color caused by the cell gap difference between the region where the transparent electrode films are overlapped with each other and the region where the transparent electrode films are not overlapped with each other, and thereby achieve an improvement in display quality.

1 Claim, 5 Drawing Sheets

5,574,583

LIQUID CRYSTAL DISPLAY DEVICE HAVING A COMPENSATION LAYER AND METHOD FOR FABRICATING THE SAME

This application is a Continuation of U.S. pat. application Ser. No. 08/284,137, filed Aug 2, 1994 now abandoned.

BACKGROUND OF THE INVENTION

1. Field of the Invention

The present invention relates to a liquid crystal display device and method for fabricating the same.

2. Description of the Prior Art

Generally, liquid crystal is a material having a behavior intermediate between liquid and solid, namely, having both a fluidity of liquid and an optical property of crystal. When such a liquid crystal is subjected to an electric field or heat, its optical anisotropy may be varied. Liquid crystal display devices aye adapted to utilize such a behavior. Such liquid crystal display devices ale representative of planar display devices, together with plasma display devices and light emitting devices.

Liquid crystal was discovered in the year 1888 by Reinitzer who was a Australian botanist. Subsequently, there were made various physical and chemical researches in liquid crystal, In the year 1963, Fergason developed a thermography using cholesteric liquid crystal. By virtue of this development, researches in liquid crystal become active again.

In particular, Heilmeier in RCA corporation who was realized of the limitations of performance of EL panel discovered the phenomenon that a transparent thin layer of nematic liquid crystal becomes white-cloudy by an electric field, during his seeking for display devices as a substitute for the EL panel in the year 1968.

FIG. 1 is a plan view illustrating a conventional liquid crystal display devices. FIG. 2 is a cross-sectional view taken along the line I—I of FIG. 1.

AS shown in FIGS. 1 and 2, the conventional liquid crystal display device includes a lower glass plate 9, an upper glass plate 10 vertically spaced apart from the lower glass plate 9, a pair of oxide films 11 adapted to prevent attachment of alkali ions to the glass plates 9 and 10, a pair of transparent electrode films 12 comprised of an indium tin oxide (ITO) layer having a certain pattern and applied within voltage, a pair of top coating films 13 adapted to prevent a short circuit of the transparent electrode films 12, and a pair of facing orientation films 14 defining a space containing a liquid crystal 15 therebetween.

In the space defined between the orientation films 14 respectively attached to the glass plates 9 and 10, a plurality of spacers 17 are arranged. The liquid crystal fills the remaining part of the space. The glass plates 9 and 10 are sealed with a seal 16. Polarization plates 18 are attached to outer surfaces of the glass plates 9 and 10, respectively.

The transparent electrode films 12 respectively formed on the glass plates 9 and 10 are arranged orthogonally with respect to each other. The glass plates 9 and 10 are sealed with the seal 16 along a seal line. The region A of FIG, 1 is a display region where the transparent electrode films 12 of the glass plates 9 and 10 are overlapped with each other. At the region B other than the display region A and defined inwardly of the seal 16, only one of the transparent electrode films 12 is disposed.

In a case of a super twist nematic (STN) liquid crystal display device requiring a more accurate cell gap, such a structure results in a color difference in the liquid crystal display, because there is a difference in total layer thickness by the thickness of one transparent electrode film.

In other words, the transparent electrode films 12 of the STN liquid crystal display device requires several ohms per meter and is comprised of an ITO film having the thickness of several hundred angstroms to several thousand angstroms. The liquid crystal display device has a portion involving a thickness difference by the thickness of one transparent electrode film 12 between the display region A where the transparent electrode films 12 are overlapped with each other to vary the twist of liquid crystal and the region B other than the display region A.

As a result, it is difficult to obtain an accurate cell gap due to the thickness difference corresponding to the thickness of one transparent electrode film 12. Due to such a cell gap difference caused by the thickness difference between the display area and the area other than the display area, the liquid crystal display device involves a difference in color display and thereby a degradation in display quality.

SUMMARY OF THE INVENTION

Therefore, an object of the invention is to solve the problems encountered in the prior art and, thus, to provide a liquid crystal display device including at least one compensation layer or dummy pattern provided at a region where transparent electrode films formed on upper and lower glass plates are not overlapped with each other, the compensation layer or dummy pattern having a thickness substantially corresponding to the thickness of one transparent electrode film and seizing to provide a uniform cell gap, thereby capable of achieving an improvement in display quality.

Another object of the invention is to provide a method for fabricating a liquid crystal display device including at least one compensation layer or dummy pattern provided at a region where transparent electrode fiilms formed on upper and lower glass plates are not overlapped with each other, the compensation layer or dummy pattern having a thickness substantially corresponding to the thickness of one transparent electrode film and serving to provide a uniform cell gap, thereby capable of achieving an improvement. in display quality.

In accordance with one aspect, the present invention provides a liquid crystal display device including a transparent compensation layer or dummy pattern formed above or beneath a top coating film formed on a selected one of upper and lower glass plates outwardly of a pattern of a transparent electrode film formed on the selected glass plate.

In accordance with another aspect, the present invention provides a method for fabricating a liquid crystal display device, comprising the steps of preparing a pair of space glass plates, forming an oxide film, a tansparent electrode film, a top coating film and an orientation film, in this order, over each of the glass plates, sealing the resulting structure, and filling a liquid crystal in a space defined between the glass plates, the method further comprising the Step of: forming at least one compensation layer at a region other than a display region where the transparent electrode films are overlapped with each other after the formation of the top coating film, the compensation layer having the same thickness as the transparent electrode film.

In accordance with another aspect, the present invention provides a method for fabricating a liquid crystal display device, comprising the steps of preparing a pair of space glass plates, forming an oxide film, a transparent electrode film, a top coating film and an orientation film, in this order, over each of the glass plates, sealing the resulting structure, and filling a liquid crystal in a space defined between the glass plates, the method further comprising the step of: forming at least one dummy pattern extending in parallel to a corresponding one of the transparent electrode films between a boundary of the display region where the transparent electrode films are overlapped with each other and a seal formed for the sealing, prior to the formation of the top coating film.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
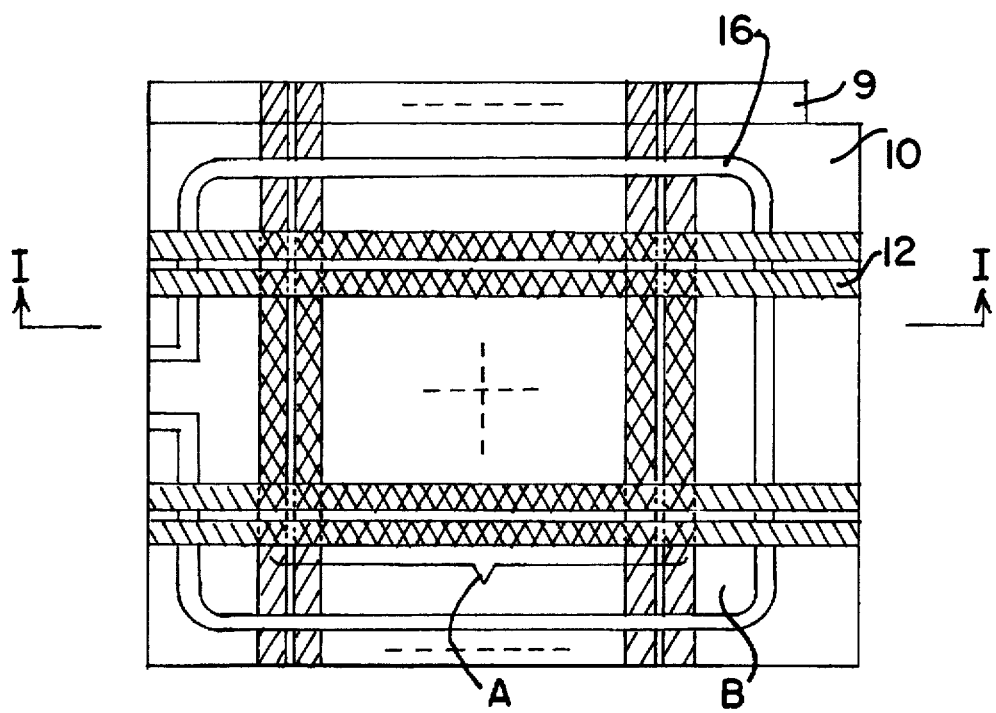
FIG. 1 is a plan view illustrating a conventional liquid crystal display device.
Figure 2:
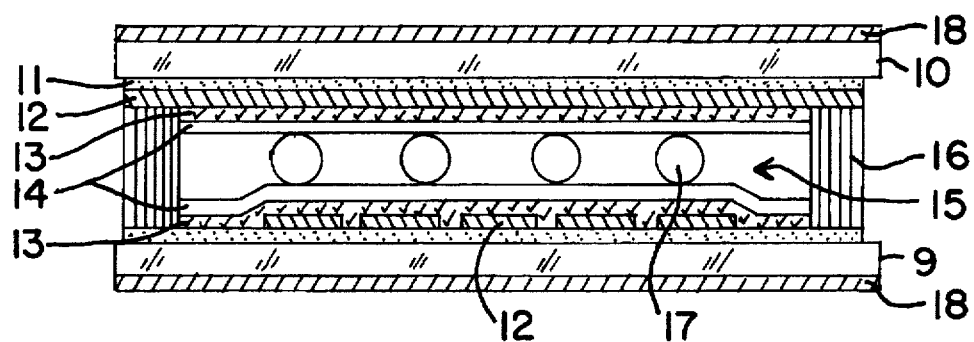
FIG. 2 is a cross-sectional view taken along the line I—I of FIG. 1.
Figure 3A:
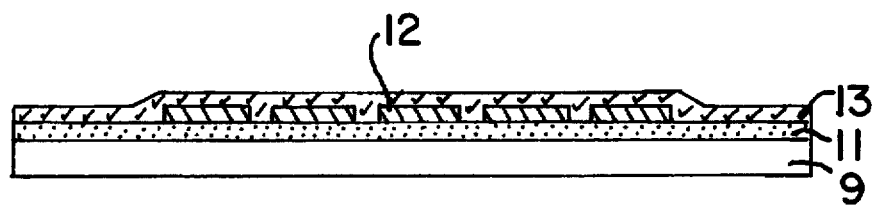
FIGS. 3A to 3C are sectional views respectively illustrating a method for fabricating a liquid crystal display device in accordance with an embodiment of the present invention.
Figure 3B:
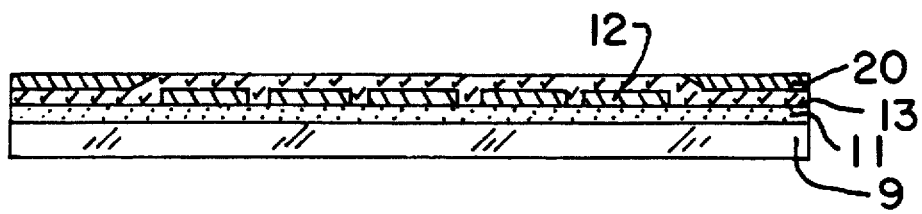
Figure 3C:
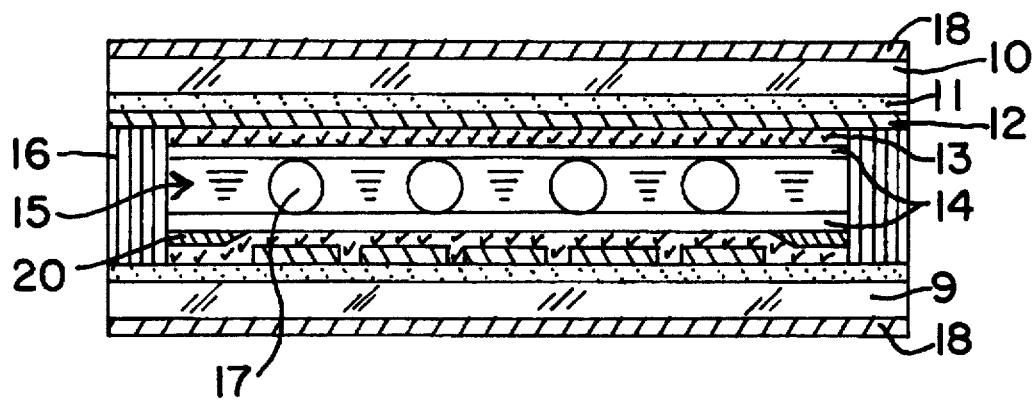

FIGS. 3A to 3C are sectional views respectively illustrating a method for fabricating a liquid crystal display device in accordance with an embodiment of the present invention. In FIGS. 3A to 3C, elements respectively corresponding to those in FIGS. 1 and 2 are denoted by the same reference numerals. In accordance with this embodiment, a transparent compensation layer is formed between a top coating film and an orientation film outwardly of a pattern of a transparent electrode film.

In accordance with this method, a pair of glass plates are prepared, one of which is used as a lower glass plate 9 while the other is used as an upper glass plate 10. Over each of the glass plates 9 and 10, an oxide film 11 as an alkali ion prevention film is formed to a thickness of 300 to 1,000 Å using a dipping process or a sputtering process, as shown in FIG. 3A. Over the oxide film 11 of each glass plate, a transparent electrode film 12 made of an ITO is then deposited to a thickness of several hundred angstroms to several thousand angstroms using the sputtering process or an electronic beam evaporator. Thereafter, the transparent electrode film 12 is photo-etched using an image process so as to have a predetermined pattern.

Over the entire exposed surface of the resulting structure of each glass plate, a top coating film 13 is formed to a thickness of several hundred angstroms using an offset roll coating method. The top coating film 13 serves to prevent a short circuit occurring at the pattern of the transparent electrode film 12 due to foreign substances or particulates. In this case, the top coating film 13 is made of an $SiO_2$-based material exhibiting a good permeability. The formation of the top coating film 13 is achieved by subjecting the top coating material to a transfer printing, a drying, an ultraviolet ray radiation and a baking.

Thereafter, a compensation layer 20 is coated on a portion (corresponding to the portion B of FIG. 1) of the top coating film 13 not over lapped with the transparent electrode film 12 on each glass plate, as shown in FIG. 3B. In actual, the compensation layer 20 may be provided on only one of the glass plates 9 and The formation of the compensation layer 20 is achieved by coating an $SiO_2$-based material using the offset roll coating method, in similar to the formation of the top coating film 13. That is, the compensation layer 20 is formed by transferring the $SiO_2$-based material on the portion for the top coating film 13 not overlapped with the transparent electrode film 12, dividing the transferred layer at a temperature of 80° to 120° C. for several minutes, exposing the dried layer to an infrared ray zone maintained at a temperature of 140° C ±° C and then to an ultraviolet ray zone maintained with an ultraviolet energy of at least 500 $mJ/cm^2$ by an ultraviolet lamp, and heat treating the resulting layer in a baking furnace maintained at a predetermined temperature of, for example, 200° to 400° C.

The compensation layer 20 may be formed using a method other than the offset roll coating method, for example, using a chemical vapor deposition and patterning method. The compensation layer 20 may be also made of a material exhibiting a good permeability other than the $SiO_2$-based material, for example, a nitride, As shown in FIG. 3C, an orientation film 14 is then formed over the resulting structure of each glass plate including the top coating film 13 and the compensation layer by use of a general process. Subsequently,the orientation film 14 is subjected to a rubbing for orienting a liquid crystal to be subsequently filled in a predetermined direction. For the rubbing, a rubbing cloth is used. Since the structure of each glass plate has a uniform surface, the rubbing cloth may have an optional pile length. However, it is preferred that the rubbing cloth has a pile length of 1.5 to 2,0 mm.

Thereafter, a seal 16 and a plurality of spacers 17 are formed on one of the glass plates 9 and 10 using a screen printing process. The seal 16 is adapted to seal a cell gap maintained between the glass plates 9 and 10 by the spacers 17. In the cell gap, a liquid crystal 15 is then filled. Finally, a pair polarization plates 18 are attached at a required angle respective outer surfaces of the glass plates 9 and 10. Thus, a liquid crystal display device is fabricated.

Figure 4A:
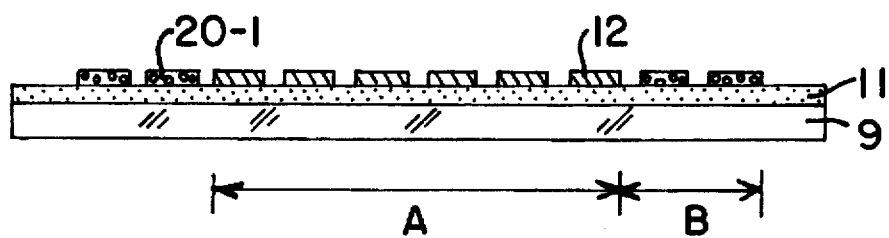
FIGS. 4A to 4C are sectional views respectively illustrating a method for fabricating a liquid crystal display device in accordance with another embodiment of the present invention.
Figure 4B:
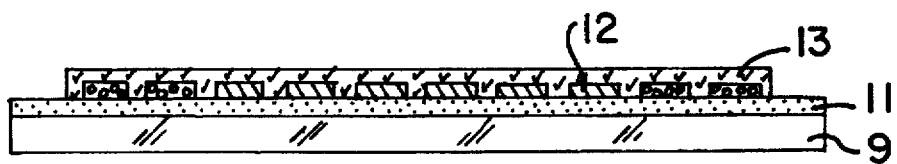
Figure 4C:
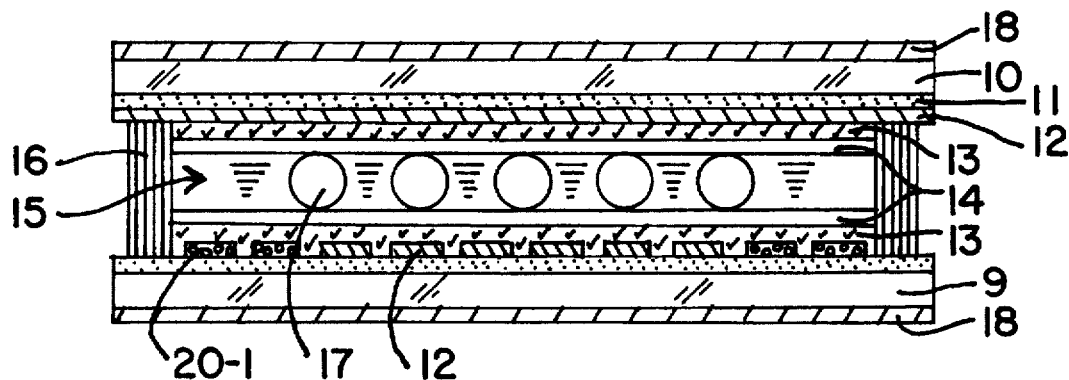

FIGS. 4A to 4C are sectional views respectively illustrating a method for fabricating a liquid crystal display device in accordance with another embodiment of the present invention. In FIGS. 4A to 4C, elements respectively corresponding to those in FIGS. 3A to 3C are denoted by the same reference numerals.

In accordance with this method, a pair of glass plates are prepared, one of which is used as a lower glass plate 9 while the other is used as an upper glass plate 10. Over each of the glass plates 9 and 10, an $SiO_2$ film as an alkali ion prevention film is coated to a thickness of 300 to 1,000 Å using the dipping process or the sputtering process, thereby forming an oxide film 11, as shown in FIG. 4A. Over this oxide film 11 of each glass plate, an ITO film is then deposited to a thickness of several hundred angstroms to several thousand angstroms using the sputtering process or the electronic beam evaporator. Thereafter, the ITO film is photo-etched, thereby forming a transparent electrode film 12 at a display region A and a dummy or redundancy pattern 21 functioning as a compensation layer. The dummy pattern 21 is disposed outwardly of the transparent electrode film 12 and inwardly of a seal 16 to be subseqently formed (FIG. 4A).

Over the entire exposed surface of the resulting structure of each glass plate, a coating film 13 is formed to a thickness of several hundred angstroms using the offset roll coating method, as shown in FIG. 4B. The top coating film 13 serves to prevent a short circuit occurring at the pattern of the transparent electrode film 12 due to foreign substances or particulates. In this case, the top coating film 13 is made of an $SiO_2$-based material exhibiting a good permeal uility.

Thereafter, an orientation film 14 is formed over the top coating film 13 of each glass plate, as shown in FIG. 4C. The orientation film 14 is then subjected to a rubbing for orienting a liquid crystal to be subsequently filled in a predetermined direction. A seal 16 and a plurality of spacers 17 are formed on one of the glass plates 9 and 10 using the screen printing process. The seal 16 is adapted to seal a cell gap maintained between the glass plates 9 and 10. The glass plates 9 and 10 are then sealed. In the cell gap, a liquid crystal 15 is then filled. Finally, a pair of polarization plates 18 are attached at a required angle to respective outer surfaces of the glass plates 9 and 10. Thus, a liquid crystal display device is fabricated.

Figure 5A:
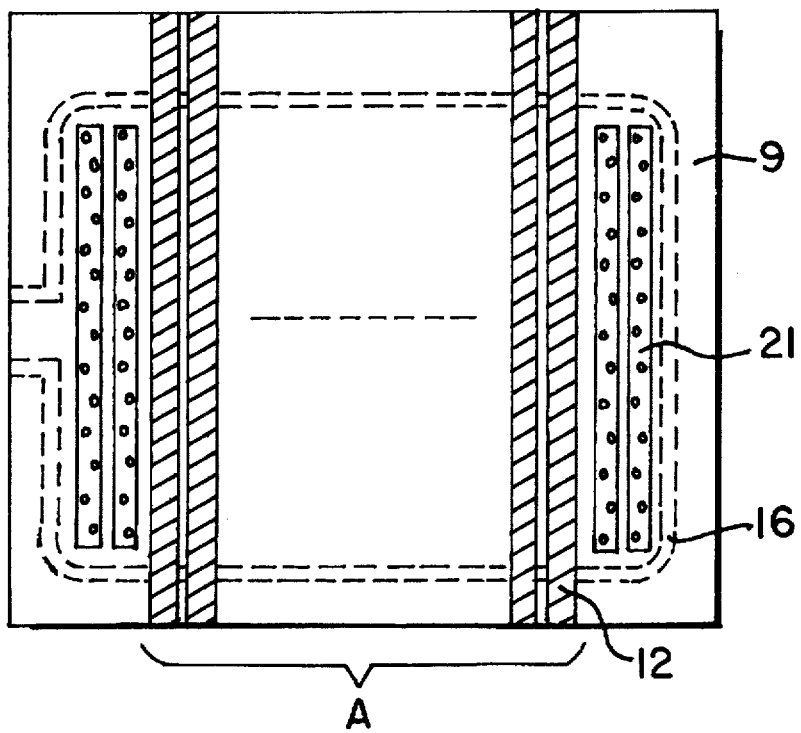
FIGS. 5A and 5B are plan views of glass plates 9 and 10 each having a structure fabricated in accordance with the method of FIGS. 4A and 4B, respectively.
Figure 5B:
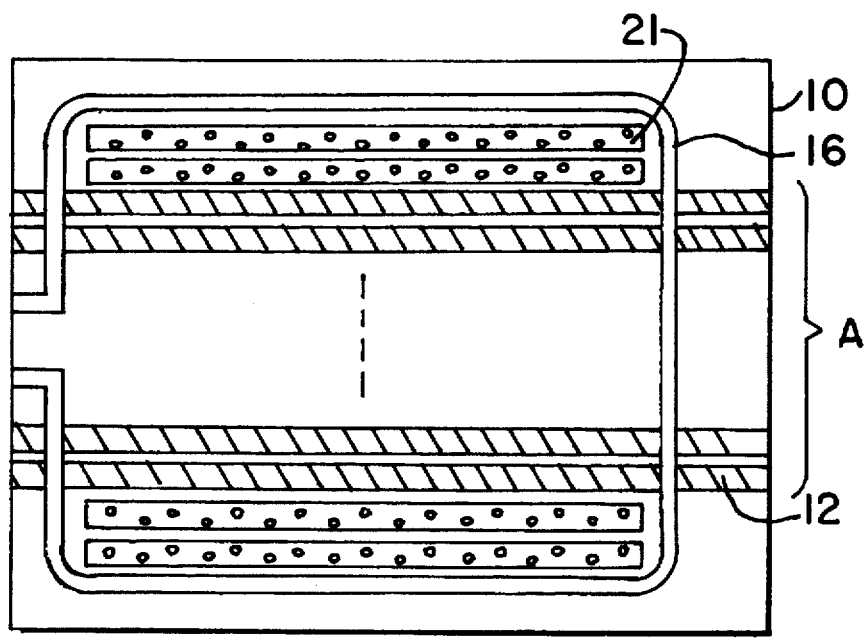

FIGS. 5A and 5B are plan views of glass plates 9 and 10 each having a structure fabricated in accordance with the method of FIGS. 4A and 4B, respectively. As shown in FIGS. 5A and 5b, the dummy pattern 21 constituted by a part of the transparent electrode film 12 is formed such that it is disposed at a region defined outwardly of the transparent electrode film 12 and inwardly of the seal 16.

The transparent electrode film 12 of the lower glass plate 9 is arranged orthogonally with respect to the transparent electrode film 12 of the upper glass plate 10. On each glass plate, the dummy pattern 21 extends in parallel to the transparent electrode film 12. It is preferred that the dummy pattern 21 is not exposed outwardly and not in contact with the seal 16.

Figure 6:
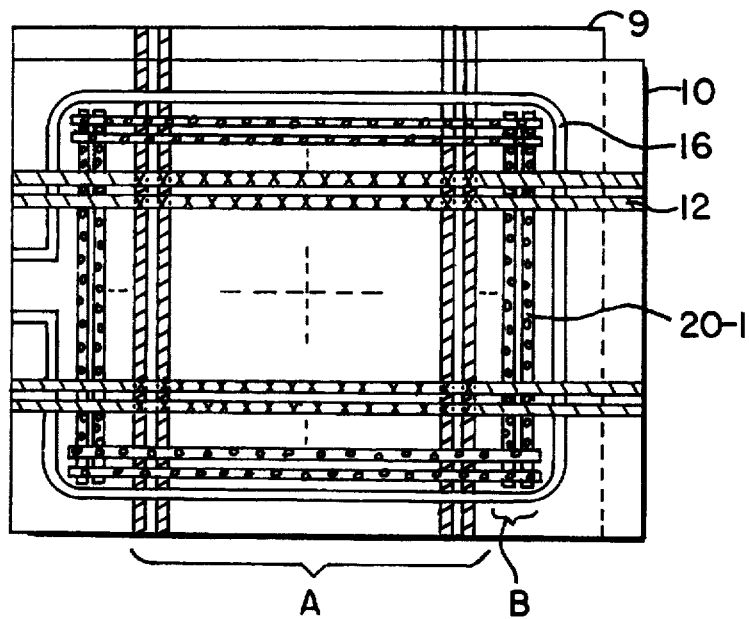
FIG. 6 is a plan view illustrating the coupled condition of glass plates respectively having the structures shown in FIGS.. 5A and 5B.
Figure 7:
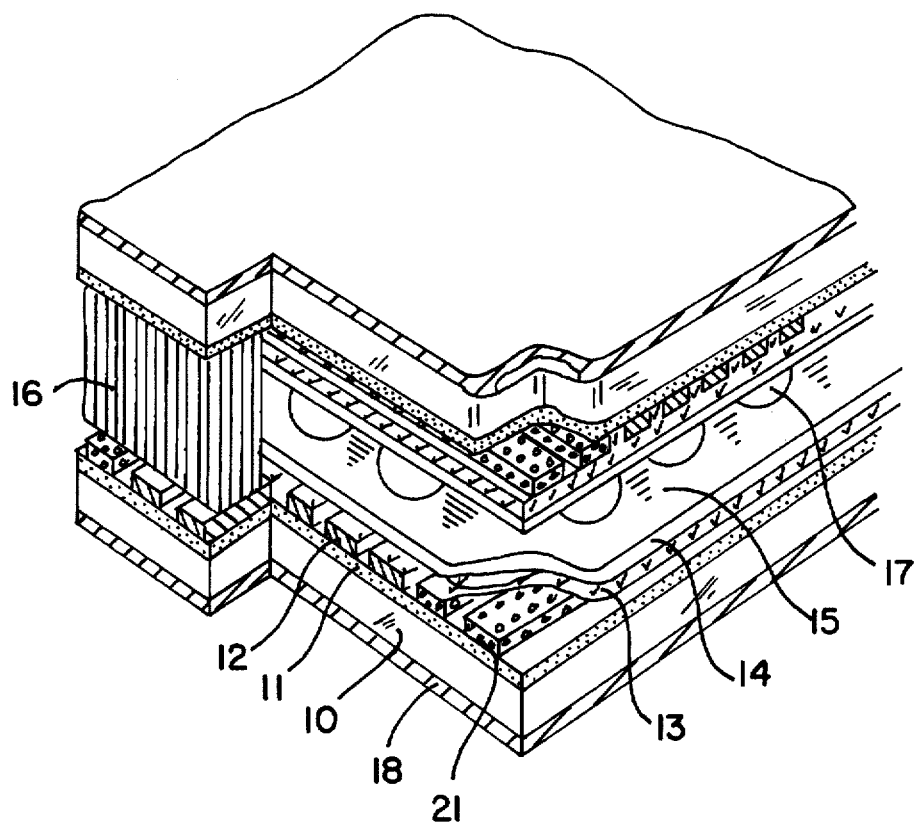
FIG. 7 is a partially-broken perspective view of the liquid crystal display device shown in FIG. 6.

FIG. 6 is a plan view of the liquid crystal display device fabricated in accordance with the method illustrated FIGS. 4A to 4C, showing the coupled condition of the glass plates 9 and 10 respectively having the structures shown in FIGS. 5A and SB. On the other hand, FIG. 7 is a partially-broken perspective view of the liquid crystal display device shown in FIG. 6. Although the liquid crystal display device shown in FIGS. 6 and 7 has the same structure at the display region A as the conventional liquid crystal display device, it also has the dummy pattern 21 which formed simultaneously with the transparent electrode film 12 at the region B defined between the display region A and the seal 16, as different from the conventional liquid crystal display device. By virtue of the dummy pattern 21, the liquid crystal display device in accordance with the present invention has the same pattern totally, thereby avoiding any difference in cell gap. Accordingly, it is possible to remove the duality of color.

Although the present invention has been described in conjunction with the liquid crystal display device having the simple matrix structure. It may be equivalently applied to liquid crystal display devices having an active matrix structure or other structures, by forming a compensation layer or dummy pattern capable of compensating a thickness difference in the transparent electrode film between the display region overlapped with the transparent electrode film and the region not overlapped with the transparent electrode film and thereby providing a uniform cell gap totally at the region defined inwardly of the seal. In particular, a superior effect can be obtained where the cell gap is not more than 6μ.

As apparent from the above description, the present invention provides a liquid crystal display device including a compensation layer capable of compensating a thickness difference among layers formed in each cell of the liquid crustal display device, and a method for fabricating the liquid crystal display device. Accordingly, it is possible to provide a uniform cell gap and thereby achieving an improvement in yield. Where each of upper and lower glass plate includes a dummy pattern having the same dimension and the same thickness as the display pattern in accordance with the present invention, there is no thickness difference in a transparent electrode film at a region defined inwardly of a seal, Adcordingly, the transparent electrode film has a uniform structure totally. By virtue of such a uniform structure of the transparent electrode film, it is possible to provide a uniform cell gap and thereby remove the duality of color.

In accordance with the present invention, a uniform transparent electrode pattern is formed inwardly of the seal line upon coating a top coating film or an orientation film. By virtue of such a uniform transparent electrode pattern, it is possible to completely eliminate any discoloration exhibited at the boundary region between the display region and the edge region and thereby achieve an improvement in display quality. Also, a poor display (discoloration) caused by a color difference in cells is removed. As a result, an improvement in yield is accomplished.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for fabricating a liquid crystal display device, comprising the steps of:

preparing a pair of spaced glass plates , forming an oxide film, a transparent electrode film, a top coating film and an orientation film, in this order, over each of the glass plates, sealing the resulting structure, and filling a liquid crystal in a space defined between the glass plates, forming at least one compensation layer at a region other than a display region where the transparent electrode films are overlapped with each other , said compensation layer formed by the steps of:

transferring an $SiO_2$ based material on the region by use of an offset roll coating process, drying the transferred layer at a temperature of 80° to 120° C. for several minutes, exposing the died layer to an infrared ray zone maintained at a temperature of 140°±20°and then to an ultraviolet ray zone maintained with an ultraviolet energy of at least 500 mJ/cm$^2$ by an ultraviolet lamp, then heat treating the resulting layer in a baking furnace maintained at a temperature of 200°to 400° C.

\* \* \* \* \*

UNITED STATES PATENT AND TRADEMARK OFFICE
CERTIFICATE OF CORRECTION

PATENT NO. : 5,574,583
DATED : November 12, 1996
INVENTOR(S) : Jae B. KIM

It is certified that error appears in the above-indentified patent and that said Letters Patent is hereby corrected as shown below:

IN THE CLAIMS:

Column 6, line 59 (claim 1)

change "died" to -- dried --

Signed and Sealed this

Fourth Day of February, 1997

Attest:

BRUCE LEHMAN

Attesting Officer      Commissioner of Patents and Trademarks